(12) United States Patent
Kummer et al.

(10) Patent No.: US 7,641,144 B2
(45) Date of Patent: Jan. 5, 2010

(54) CROSS-FLOW FAN PROPULSION SYSTEM

(75) Inventors: Joseph D. Kummer, Fayetteville, NY (US); Thong Q. Dang, Fayetteville, NY (US)

(73) Assignee: Syracuse University, Syracuse, NY (US)

( * ) Notice: Subject to any disclaimer, the term of this patent is extended or adjusted under 35 U.S.C. 154(b) by 253 days.

(21) Appl. No.: 11/379,731

(22) Filed: Apr. 21, 2006

(65) Prior Publication Data

US 2006/0266882 A1 Nov. 30, 2006

Related U.S. Application Data

(60) Provisional application No. 60/673,541, filed on Apr. 21, 2005, provisional application No. 60/673,624, filed on Apr. 21, 2005, provisional application No. 60/673,552, filed on Apr. 21, 2005.

(51) Int. Cl.
*B64C 21/00* (2006.01)
(52) U.S. Cl. .................... 244/12.5; 244/12.1
(58) Field of Classification Search .............. 244/2, 244/12.1, 12.5, 19, 206, 12.4, 15, 23 D, 23 R
See application file for complete search history.

(56) References Cited

U.S. PATENT DOCUMENTS

| 1,714,609 | A | | 5/1929 | Massey | |
|---|---|---|---|---|---|
| 3,082,976 | A | | 3/1963 | Domier | |
| 3,178,131 | A | | 4/1965 | Laing | |
| 3,212,735 | A | | 10/1965 | Laing | |
| 3,267,668 | A | * | 8/1966 | Erwin | 60/226.1 |
| 3,576,300 | A | | 4/1971 | Jack | |
| 4,194,707 | A | * | 3/1980 | Sharpe | 244/9 |
| 6,016,992 | A | * | 1/2000 | Kolacny | 244/12.6 |
| 6,527,229 | B1 | * | 3/2003 | Peebles | 244/204.1 |
| 2004/0201220 | A1 | * | 10/2004 | Andersen et al. | 290/44 |

FOREIGN PATENT DOCUMENTS

DE 636244 10/1963

OTHER PUBLICATIONS

Roadable Times—The Internet Magazine of Flying Cars & Roadable Aircraft, Feb. 23, 2003—www.roadabletimes.com.

* cited by examiner

*Primary Examiner*—Michael R Mansen
*Assistant Examiner*—Michael Kreiner
(74) *Attorney, Agent, or Firm*—George R. McGuire; David L. Nocilly; Bond Schoeneck & King, PLLC

(57) ABSTRACT

A cross-flow propulsion mechanism for use in providing propulsion to an aircraft, includes a housing defining an inlet, a rotor compartment, and an outlet. The inlet is adapted to receive an inflow of air along a first longitudinal axis. The rotor is mounted within the rotor compartment and adapted to receive the airflow introduced into the housing through the inlet and rotate about a second longitudinal axis that is substantially perpendicular to the first longitudinal axis. The outlet is adapted to receive the airflow processed through the rotor and exhaust air along a third longitudinal axis that is substantially parallel to the first longitudinal axis. The propulsion mechanism can be applied in a personal aircraft, an STOL aircraft, and a hybrid automobile and aircraft.

12 Claims, 16 Drawing Sheets a) Fan off b) Fan on – 1,000 rpm a) Fan off b) Fan on – 1,250 rpm

CROSS-FLOW FAN PROPULSION SYSTEM

PRIORITY CLAIM

This application claims priority to U.S. Provisional Patent Application Ser. No. 60/673,541, filed Apr. 21, 2005, U.S. Provisional Patent Application Ser. No. 60/673,624, filed Apr. 21, 2005 and U.S. Provisional Patent Application Ser. No. 60/673,552, filed Apr. 21, 2005.

BACKGROUND OF THE INVENTION

1. Field of the Invention

The present invention relates to aircraft propulsion systems and, more specifically, a cross-flow fan propulsion system.

2. Description of the Prior Art

The cross-flow fan (CFF), developed in 1893 by Mortier, is used extensively in the HVAC industry. The fan is usually long in relation to the diameter, so the flow approximately remains 2-dimensional (2D). The CFF uses an impeller with forward curved blades, placed in a housing consisting of a rear wall and vortex wall. Unlike radial machines, the main flow moves transversely across the impeller, passing the blading twice. FIG. 1 shows a typical heating, ventilation, and air conditioning (HVAC) configuration. For an aircraft installation, the propulsor must ingest and expel the flow in a linear manner to produce forward thrust. The conventional HVAC-type CFF housing, characterized by approximately a 90 degree turn from inlet to outlet, is not well suited for this application Inherent in all designs is a vortex region near the fan discharge, called an eccentric vortex, and a paddling region directly opposite. These regions are dissipative, and as a result, only a portion of the impeller imparts useable work on the flow. The cross-flow fan, or transverse fan, is thus a 2-stage partial admission machine. The popularity of the cross-flow fan comes from its ability to handle flow distortion and provide high pressure coefficient. Effectively a rectangular fan, the diameter readily scales to fit the available space, and the length is adjustable to meet flow rate requirements for the particular application. Since the flow both enters and exits the impeller radially, the cross-flow fan is well suited for aircraft applications. Due to the 2D nature of the flow, the fan readily integrates into a wing for use in both thrust production and boundary layer control.

In addition to increased propulsive efficiency, embedded propulsion provides reduced noise and increased safety, since the propulsor is now buried within the structure of the aircraft (e.g. no exposed propellers). Also, based on the methods in Ref. 4, by eliminating the engine pylon/nacelle support structure, the aircraft parasite drag can be reduced by up to 18 to 20%, thus improving cruise efficiency and range.

Attempts to provide a cross-flow fan in aircraft wings haven been unsuccessful. For example, some designs uses cross-flow fans embedded within the middle of a conventional airplane wing. Other designs distribute fully embedded cross-flow fans near the trailing edge of a conventional transport aircraft, with shafts and couplings connecting them to wing-tip and root-mounted gas turbines. Air is ducted into the fan from both wing surfaces, and expelled out at the trailing edge. These designs, however, limits the fan size and ducting. Also, the CFF may not be a viable option for high-speed applications due to compressibility effects (i.e. choking). These configurations fall short of expectations due to poor fan placement and poor housing design. These deficiencies result in low fan performance, reduced circulation control, and low thrust production.

SUMMARY OF THE INVENTION

It is therefore a principal object and advantage of the present invention to provide a distributed cross-flow fan wing design that provides high propulsive efficiency.

It is a further object and advantage of the present invention to provide a distributed cross-flow fan wing design that provides low parasite drag.

It is an additional object and advantage of the present invention to provide a distributed cross-flow fan wing design that provides reduced flow separation at high angle of attack.

In accordance with the foregoing objects and advantages, in one application, the present invention provides a cross-flow propulsion mechanism for use in providing propulsion to an aircraft, that includes a housing defining an inlet, a rotor compartment, and an outlet, with the inlet adapted to receive an inflow of air along a first longitudinal axis; a rotor mounted within the rotor compartment and adapted to receive the airflow introduced into said housing through the inlet and rotate about a second longitudinal axis that is substantially perpendicular to the first longitudinal axis; and an outlet adapted to receive the airflow processed through the rotor and exhaust air along a third longitudinal axis that is substantially parallel to the first longitudinal axis.

In a second application of the invention, it provides an aircraft including an aircraft body shaped in the form of an airfoil having leading and trailing edges; and a cross-flow propulsion mechanism for use in providing propulsion to an aircraft, that includes a housing defining an inlet, a rotor compartment, and an outlet, with the inlet adapted to receive an inflow of air along a first longitudinal axis; a rotor mounted within the rotor compartment and adapted to receive the airflow introduced into said housing through the inlet and rotate about a second longitudinal axis that is substantially perpendicular to the first longitudinal axis; and an outlet adapted to receive the airflow processed through the rotor and exhaust air along a third longitudinal axis that is substantially parallel to the first longitudinal axis.

In a third application of the present invention, it provides a vehicle convertible between land travel and air travel, that includes a vehicle body shaped in the form of an airfoil having leading and trailing edges; and a cross-flow propulsion mechanism for use in providing propulsion to an aircraft, that includes a housing defining an inlet, a rotor compartment, and an outlet, with the inlet adapted to receive an inflow of air along a first longitudinal axis; a rotor mounted within the rotor compartment and adapted to receive the airflow introduced into said housing through the inlet and rotate about a second longitudinal axis that is substantially perpendicular to the first longitudinal axis; and an outlet adapted to receive the airflow processed through the rotor and exhaust air along a third longitudinal axis that is substantially parallel to the first longitudinal axis.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
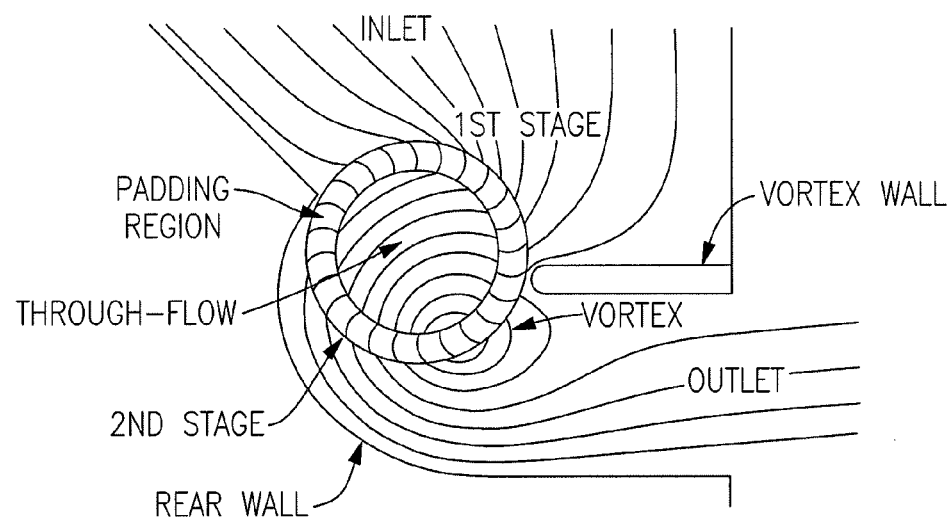
FIG. 1 is a diagram of a prior art cross-flow fan.
Figure 2:
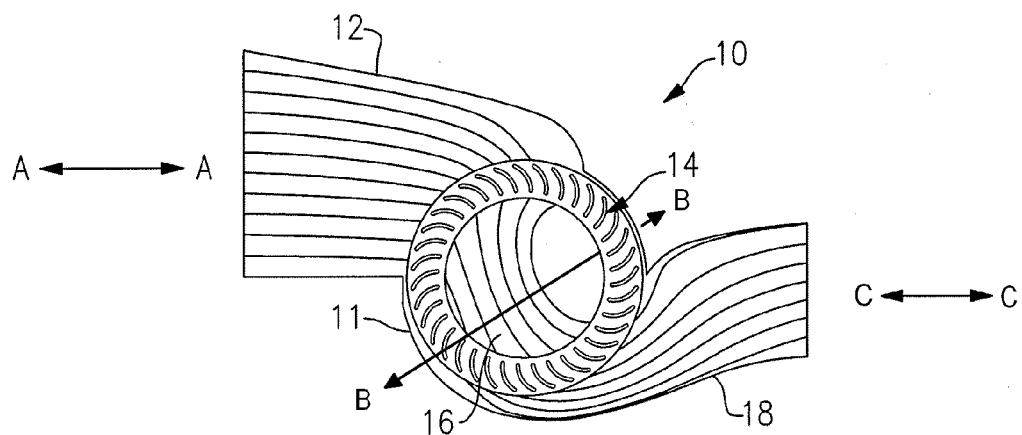
FIG. 2 is a diagram of a baseline inline housing according to the present invention.
Figure 3:
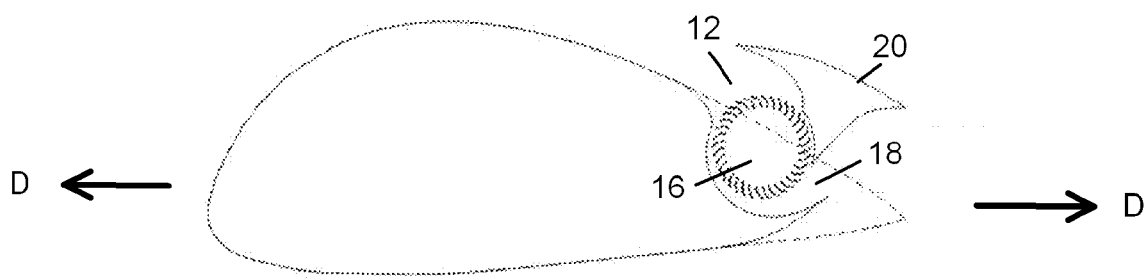
FIG. 3 is a diagram of a cross-flow fan airfoil geometry according to the present invention.

Glossary:
A=area
$C_D$=airfoil drag coefficient, $D/(0.5 \rho U_\infty^2 c)$
$C_L$=airfoil lift coefficient, $L/(0.5 \rho U_\infty^2 c)$
$C_P$=power coefficient, Power$/(\rho U_\infty^3 D_f)$
$C_T$=thrust coefficient, $T/(0.5 \rho U_\infty^2 D_f)$
CS=control surface
D=drag per unit span
$D_{BL}$=drag due to boundary layer build-up
$D_f$=cross-flow fan diameter
$F_x$=x-component of force
H=arbitrarily large distance
$h_i$=propulsor inlet height
$h_j$=propulsor outlet height
$h_w$=ingested wake height
$\bar{h}$=non-dimensionalized ingested wake height
L=lift per unit span
$\dot{m}$=mass flow rate
p=variable
$P_P$=propulsive power
$P_T$=total pressure
$P_{T_i}$=total pressure at propulsor inlet
$\overline{P_{T_i}}$=mass-weighted total pressure at propulsor inlet
Q=flow rate per unit span
r=radial distance
T=propulsor thrust
U=velocity
$U_f$=fan tip speed
$\tilde{U}_j$=non-dimensionalized jet velocity, $U_j/U_\infty$
$U_W$=propulsor inlet velocity with wake ingestion
$U_\infty$=velocity in freestream
x=x-coordinate
y=y-coordinate
Δ=change in value
φ=flow coefficient, $Q/(D_f U_f)$
$\eta_p$ propulsive efficiency
$\eta_t$=total efficiency, $(Q \Delta P_T)/(\Omega \tau)$
μ=advance ratio, $U_\infty/U_f$
$\mu_v$=absolute viscosity
ρ=density
$\Psi_t$=total pressure coefficient, $\Delta P_T/(0.5 \rho U_f^2)$
τ=fan torque
Ω=fan speed, rad/s
Subscripts and Superscripts
in=into control volume
j=in jet
'=non-wake ingestion Referring now to the drawings, wherein like reference numerals refer to like parts throughout, there is seen in FIGS. 2 and 3, a cross-flow fan (CFF) propulsion system designated generally by reference numeral 10 generally comprises a housing 11 that defines an inlet 12 into which air flows along a first longitudinal axis A-A, a rotor compartment 14 in which a rotor 16 is mounted for rotational movement about a second longitudinal axis B-B that is substantially perpendicular to axis A-A, and an outlet 18 from which air is exhausted along a third longitudinal axis C-C that is substantially parallel to and vertically spaced below axis A-A. A movable deflector 20 may be attached to the housing 11 to alter the flow direction of the inlet 12 and outlet 18.

With reference to FIGS. 17-21, a personal aircraft 100 that incorporates CFF 10 therein is illustrated. Aircraft 100 includes a body 102 that shaped in the form of an airfoil and that extends along a longitudinal axis D-D. CFF 10 is mounted transversely across body 102 (i.e., the trailing edge of the airfoil), such that axis B-B is transverse to axis D-D. Preferably, CFF 10 is mounted above body 102 such that the airflow passing over body 102 is effectively captured by inlet 12, while not being impacted by other vortices created by body 102, as explained in greater detail hereinafter. CFF 10 is preferably of a width that approximates the width of the body 102. Deflector 20 may be used, preferably via computer control as is in known to those skilled in the art, to change the direction of the exhausted airflow to enhance lift or drag as desired for take-off or landing. Streamed exit ducting allows for easily controlled vectored thrust. The middle section of aircraft 100 contains ample space for passenger seating or cargo.

Figure 22:
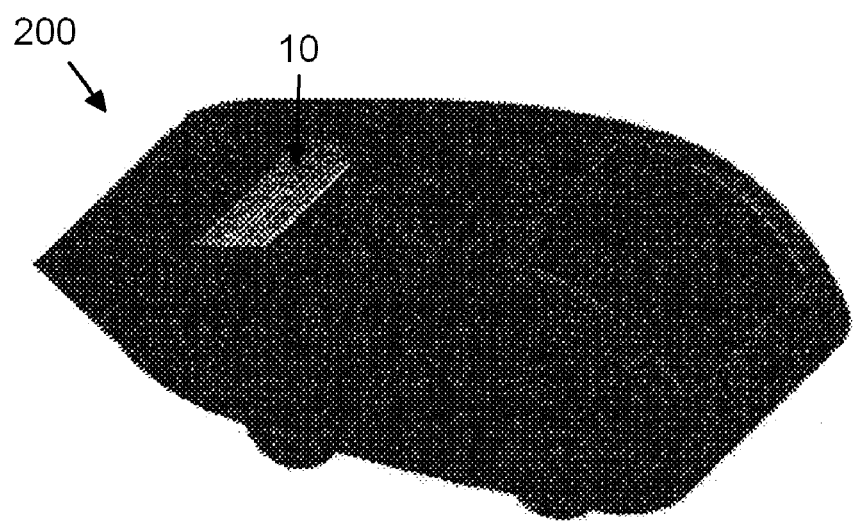
FIG. 22 is a perspective view of a convertible automobile/aircraft in the automobile configuration according to the present invention.
Figure 23:
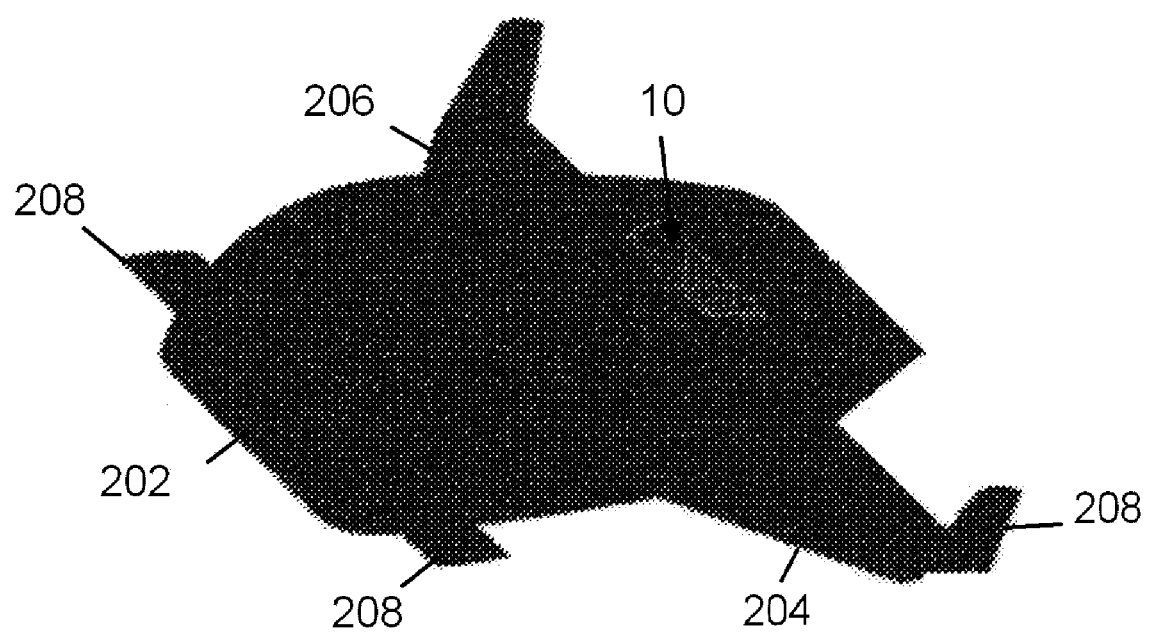
FIG. 23 is a perspective view of a convertible automobile/aircraft in the aircraft configuration according to the present invention.
Figure 24:
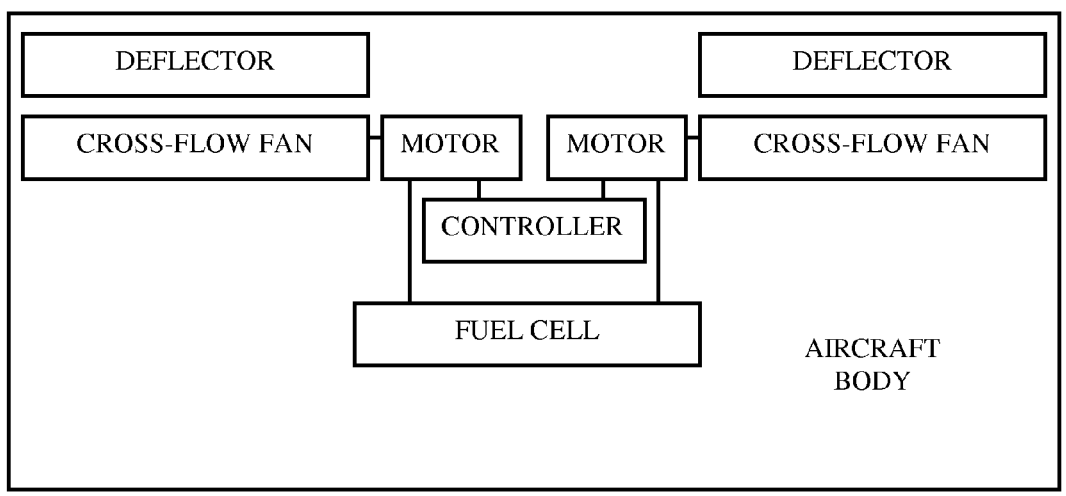
FIG. 24 is a schematic of another embodiment of an aircraft according to the present invention.

With reference to FIGS. 22-23, a vehicle 200 that is convertible between a land based vehicle (i.e., car) and aircraft and that incorporates CFF 10 is illustrated. Vehicle 200 includes an airfoil shaped body 202 at the trailing edge of which CFF 10 is mounted. Wings 204 and 206 may be detachably mounted to opposing sides of body 202 to enhance lift characteristics of the vehicle, as can stability elements 208, such as canards, elevators, and the like. As with the other applications, CFF is preferably of a width that approximates the width of the body.

Vehicle 200 may dimensioned to meet the maximum width allowed over conventional roads and highways. Vehicle 200 includes an airfoil shaped exterior preferably with a 34 percent thickness-to-chord ration. In addition, vehicle 200 has removable or retractable access to CFF 10. Vehicle may be converted with the addition or removal of stability element 208, such as rotating canards, on either side of a body 202, and detachable wings 204, 206 having conventional circulation control airfoil shapes for both lift enhancement (increasing wing aspect ratio) and flight control (e.g., ailerons, elevators, tail). Flight control may also be enhanced with vectored thrust from deflector 20 of CFF 10. The detachable wings may be taken off and stored when not in use.

Despite relatively low fan efficiency, the present invention is competitive with conventional propulsion technologies. The raised inlet eliminates the fan size restriction caused by fully embedding the fan within the airfoil. Also, cross-flow fan performance is quite insensitive to even large amounts of wake ingestion, making it ideal for this type of configuration. In fact, the fan of the present invention is capable of drawing in the boundary layer, regardless of its thickness.

Referring to the 34 percent thick airfoil seen in FIG. 3, even at low angle of attack, the wake can be quite large, producing large pressure drag. This renders very thick wing sections impractical for most aircraft applications as the drag penalty outweighs any benefits gained in lift or interior volume. Without the suction effect of a rear-mounted CFF, the flow separates given only a small angle of attack. The embedded cross-flow fans near the trailing edge eliminate flow separation by drawing the flow back toward the surface and into the fan ducting, yielding very high lift coefficients. This in turn results in short takeoff and landing (STOL) capability and low in-flight aircraft stall speed without the use of additional high lift devices, such as slotted flaps and leading edge slats. The combination of circulation control and differential thrust, accomplished through fan speed and inlet height regulation, may eliminate the need for control surfaces. By vectoring the thrust via a jet flap, additional lifting force and control are also possible. Additionally, the low fan efficiency will be off-set by lower drag (e.g. engine nacelle, pylon, and interference drag not present).

CFD Simulations

CFD simulations of the cross-flow fan airfoil were performed using a 2D double-precision segregated solver. Second-order discretization of the convective terms was used throughout all calculations, and the SIMPLE algorithm provided pressure-velocity coupling. The standard k-ε turbulence model was used with the enhanced wall treatment option, which combines a two-layer model with enhanced wall functions for greater robustness in near-wall grid generation (i.e. relaxed requirements on wall $y^{30}$ values). In order to simulate the fan rotating, the area surrounding the blades was designated as a sliding mesh region.

Unsteady simulations require proper setting of both the time step size and the convergence criteria within each time step. For cross-flow fan simulations, a time step size equal to $1/20^{th}$ the blade passing period (e.g. 720 time steps per revolution for a 36-bladed fan) captured the unsteady flow quite well. Within each time step, iterations were performed until the solution no longer changed. It was found necessary to reduce all residuals (continuity, momentum, and turbulence quantities) to at least $10^{-5}$, although for most cases, the residuals were reduced several orders of magnitude less (usually $10^{-7}$ to $10^{-10}$). All results are time-averaged data over one fan revolution. Dual-CPU Pentium 4 PCs, as well as multiple nodes of a 30-node Beowulf cluster, were used, with the computational time ranging from two days for the housing alone up to about two weeks for the full cross-flow fan airfoil.

Baseline Inline Housing

Figure 4:
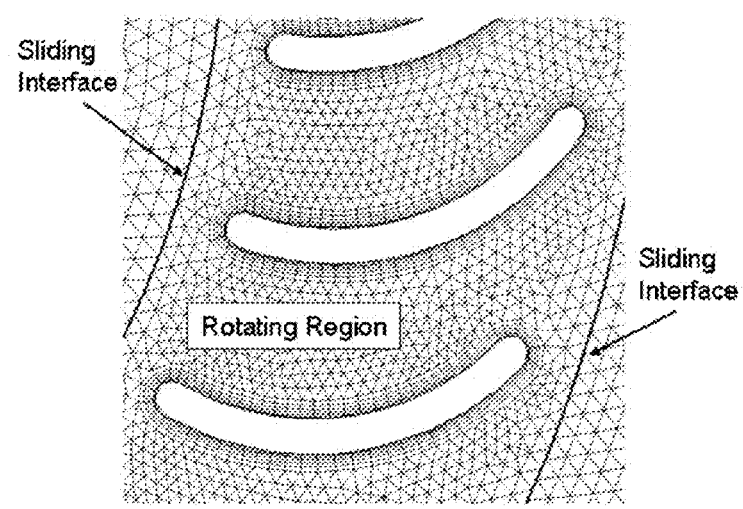
FIG. 4 is a diagram of the grid according to the present invention near the fan blades.

The baseline inline housing shown in FIG. 2 is divided into three regions: the flow through the duct, the fan bladed region, and the fan interior. The fan bladed region rotated at a specified rpm, while the other two regions remained stationary. A close-up of the grid surrounding the blades is shown in FIG. 4. Quadrilateral mesh was used near the blade surfaces and along the casing walls, and triangular mesh filled in the remainder of the domain. The combination gave a smooth transition from the blade and wall surfaces to the sliding interfaces. Since no experimental data exists for the current configuration, validation of the CFD model was performed using published results for other housings, and will be presented in a future paper.

For the simulation, a 0.3 m diameter 36-blade fan was selected. The blades consisted of simple circular arcs with rounded leading and trailing edges. The inlet and outlet heights were 0.3 m and 0.176 m, respectively. The density and viscosity were set to standard sea level conditions: $\rho=1.225$ kg/m$^3$ and $\mu_v=1.7894\times10^{-5}$ kg/(m-s). At the inlet, uniform ambient total pressure was specified with a turbulence intensity of 1% and hydraulic diameter of 0.3 m. A uniform static pressure boundary condition was specified at the outlet. Changes in mass flow rate, and hence flow coefficient, were achieved by adjusting the back-pressure. The data presented corresponds to a fixed fan speed of 2,000 rpm and a time step size of $4.17\times10^{-5}$ s.

Figure 5:
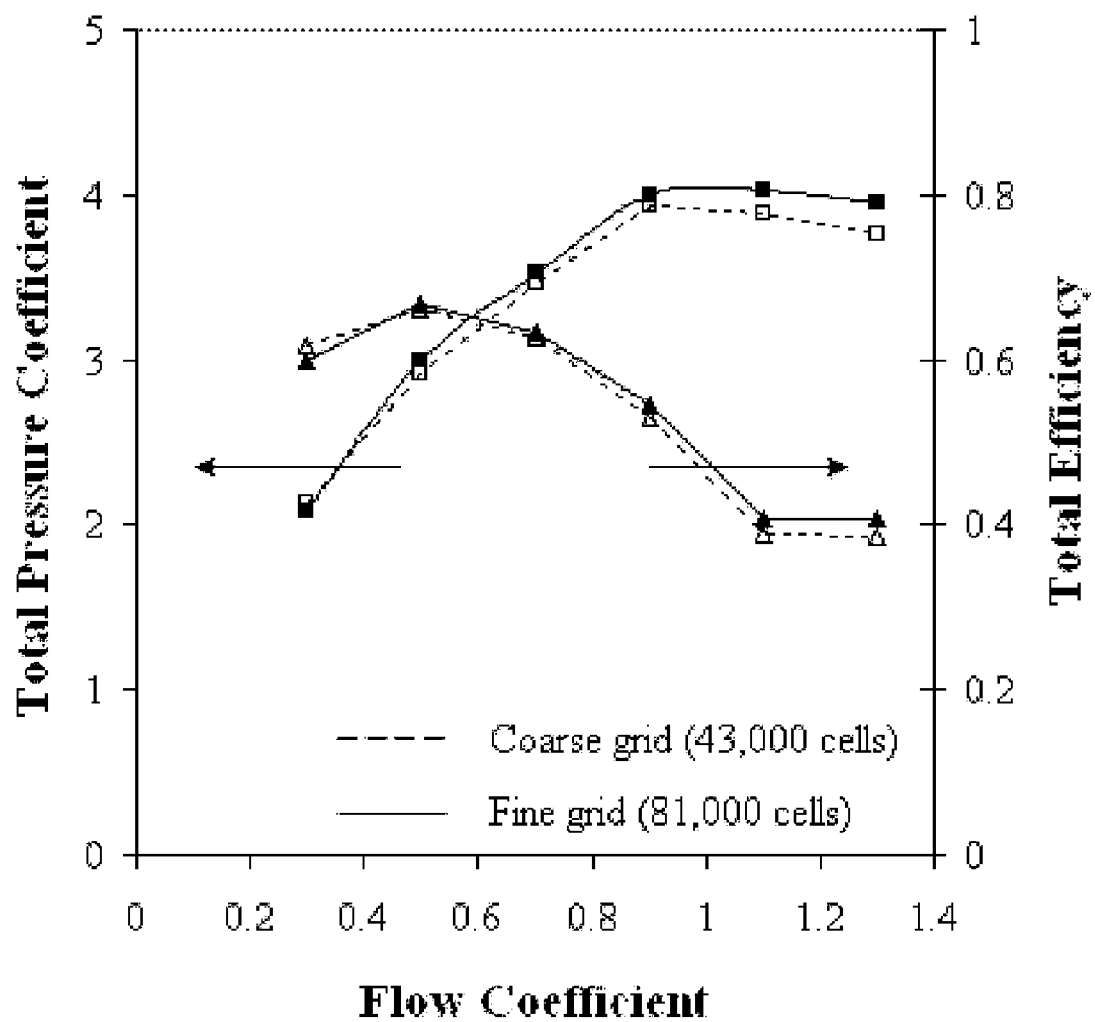
FIG. 5 is a chart of computed inline housing performance according to the present invention.

A grid dependency study was performed, with the final mesh consisting of 81,000 cells. The calculated fan performance for this case is shown in FIG. 5. The figure also shows the results for a coarser grid with only 43,000 cells. The graph shows that using half the grid cells produces only a small change in the results. A common feature of cross-flow fans, it is interesting to note that the operating point corresponding to maximum total pressure coefficient does not coincide with that for maximum total efficiency. For the fine mesh, the maximum total pressure coefficient is 4.03 at $\phi=1.1$; the total efficiency reaches a maximum value of 67% at $\phi=0.5$.

Cross-Flow Fan Airfoil

Simulation of the cross-flow fan airfoil takes considerably more time than for the housing alone. The time to reach steady-state is based on the flow time from inlet to outlet. As the domain is small, for the baseline housing this occurs after only a few thousand time steps. In contrast, for the CFF-Airfoil simulations, the steady-state is not reached for many times that number, since the computational domain measures 20 c×20 c, where c is the airfoil chord length. As an example, with the airfoil at zero degree angle of attack and the fan speed set to 1,000 rpm, the unsteady calculations took about 24,000 time steps, or about 2 seconds of flow time, to reach the steady-state. The drastic increase in computation time stems from the fact that in the latter case enough time must elapsed for the error in the initial solution to convect downstream and out of the domain. The same is true for the housing alone; however, the domain is significantly smaller, allowing the error to propagate out much faster.

The airfoil geometry is seen in FIG. 3. An airfoil chord length of 15 ft was selected, and the corresponding cross-flow fan diameter was 2.1 ft. At the inlet, uniform velocity was specified in the positive x-direction with a turbulence intensity of 1% and turbulence viscosity ratio of 5%. At the outlet, a uniform static pressure boundary condition was used. Symmetry boundaries were specified for the top and bottom of the domain.

Mesh generation was similar to the inline housing case. Quadrilateral mesh covered the blade surfaces and exterior airfoil geometry, and triangular mesh filled in between. Two interfaces were again used: one just outside of the fan blades, and one just inside. To demonstrate solution dependency to mesh changes, the present invention was simulated at zero degree angle of attack at an altitude of 8,000 ft: $\rho=0.001868$ slug/ft$^3$ and $\mu_v=3.5753\times10^{-7}$ lbf-s/ft$^2$. The freestream velocity was set to 206 ft/s, and the fan speed to 1,000 rpm. The corresponding time step size used was $8.33\times10^{31\ 5}$ s. The starting solution for the unsteady case was obtained by first performing a steady calculation with the fan modeled as a moving reference frame zone. In doing this, the fan region does not rotate; however, the no-slip boundary condition on the fan blades is still enforced in the relative frame (i.e. the local blade velocity is equal to $\Omega r$). This produces a total pressure rise through the fan with magnitude comparable to the unsteady calculation, and consequently provides a good initial solution for the external aerodynamics.

The grid dependency study presented consists of three grids of increasing resolution: 64,000 cells, 88,000 cells, and 131,000 cells. The average fan blade y$^+$ values for the coarse, medium, and fine grids were 63, 46, and 22, respectively. Table 1 gives the final computed results for each grid, along with the percent difference between the fine and the two coarser grids. In the current configuration, the jet leaves the fan with a large amount of swirl, causing the flow to deflect upwards, and resulting in a net downward force on the airfoil (i.e. negative lift coefficient). The results show only a small difference between the medium and fine grids, justifying use of the fine grid for the remainder of the CFF-Airfoil simulations.

TABLE 1

Grid comparison at 1,000 rpm

| | Coarse Grid | | Medium Grid | | Fine |
|---|---|---|---|---|---|
| Parameter | Value | % Difference from Fine Grid | Value | % Difference from Fine Grid | Grid Value |
| $\phi$ | 0.933 | 1.7 | 0.909 | −1.0 | 0.918 |
| $\Psi_t$ | 4.260 | 5.8 | 4.032 | 0.1 | 4.026 |
| $\eta_t$ | 0.547 | −1.6 | 0.555 | 0.0 | 0.555 |
| $C_L$ | −0.561 | −10.7 | −0.604 | −3.9 | −0.628 |

The present invention was next simulated at 10 degrees angle of attack at 200 ft/s and standard sea level conditions. The fan speed was again set at 1,000 rpm; the time step size remained at $8.33\times10^{-5}$ s. The grid was generated by rotating the airfoil clockwise and reconstructing the grid as done previously. The jet deflector was aligned horizontally to force the flow to leave the CFF ducting in the freestream direction.

Figure 6:
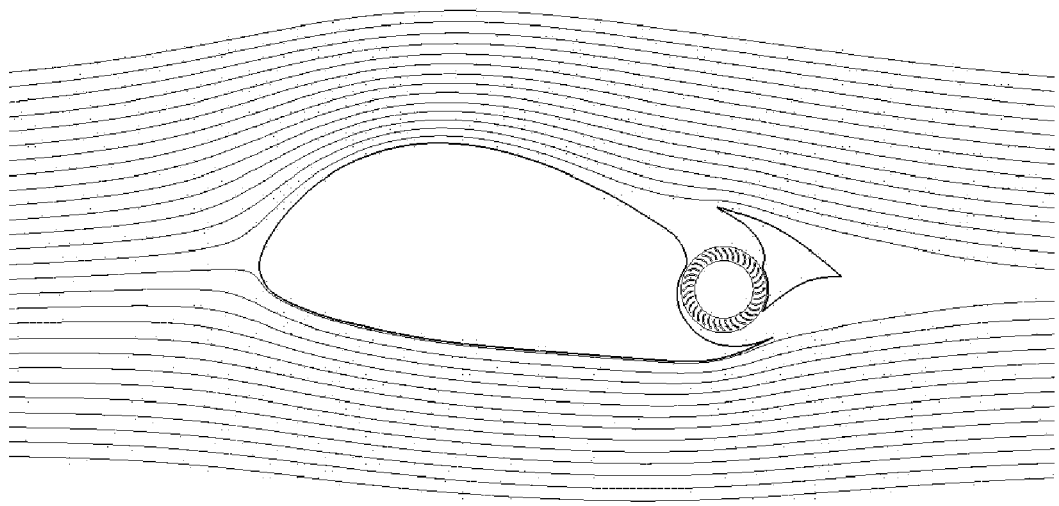
FIG. 6 is a diagram of time-averaged streamlines at 10 degrees angle of attack according to the present invention.
Figure 6:
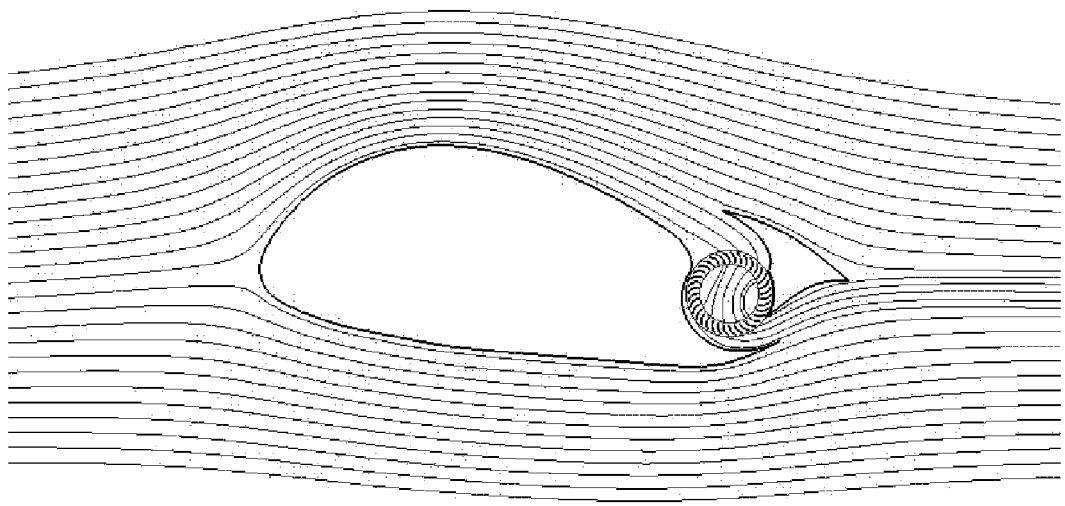
Figure 7:
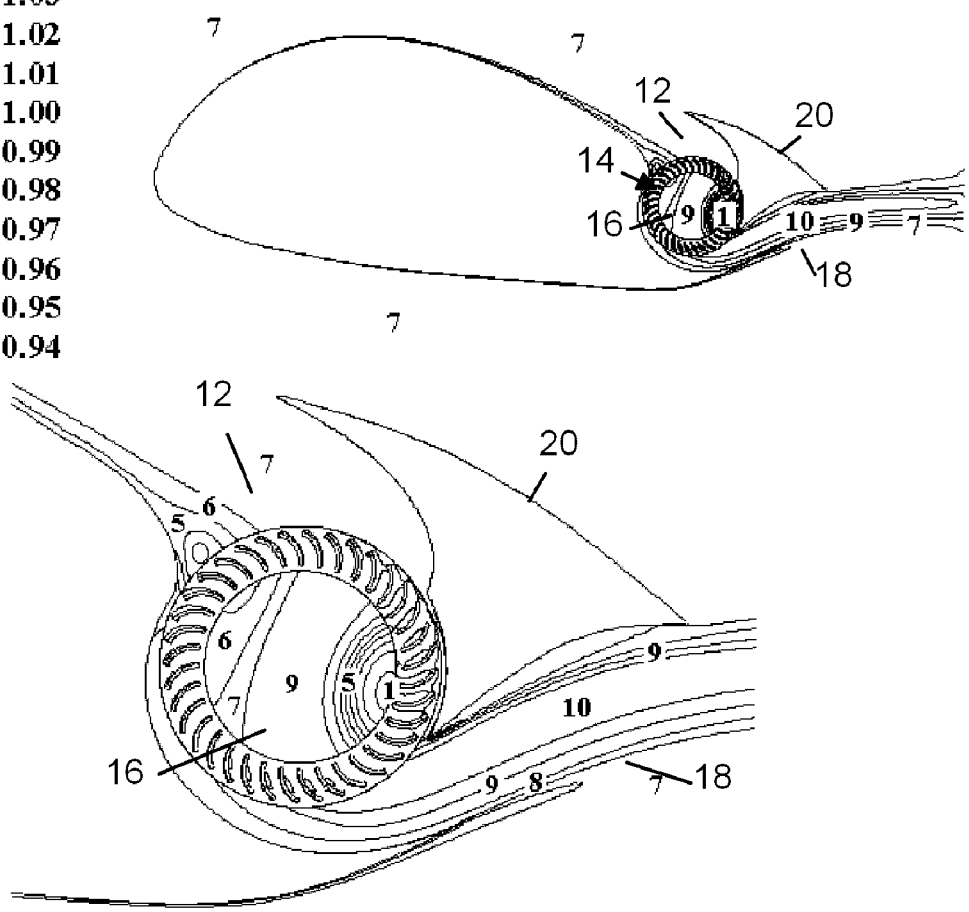
FIG. 7 is a diagram of total pressure ratios at 10 degrees angle of attack according to the present invention.

FIG. 6 illustrates the streamlines for this test. With the fan off, the flow effectively bypasses the fan ducting, producing a large wake behind the airfoil. With the fan on, however, the wake size reduces dramatically. Total pressure contours with the fan on are seen in FIG. 7, and present a clear picture of where energy is gained and lost. The values in FIG. 7 are presented as total pressure ratio, defined as the local total pressure divided by the freestream value. The large values for total pressure ratio in the exhaust correspond to the thrust producing high momentum jet flow, whereas values less than 1.0 represent energy loss. In FIG. 7, the boundary layer growth over the suction surface is apparent. An important feature of the cross-flow fan is its ability to operate well even when the inlet profile is non-uniform due to ingestion of low momentum boundary layer flow. Also visible in FIG. 7 is the eccentric vortex, the region of very low total pressure located within the fan.

Figure 8:
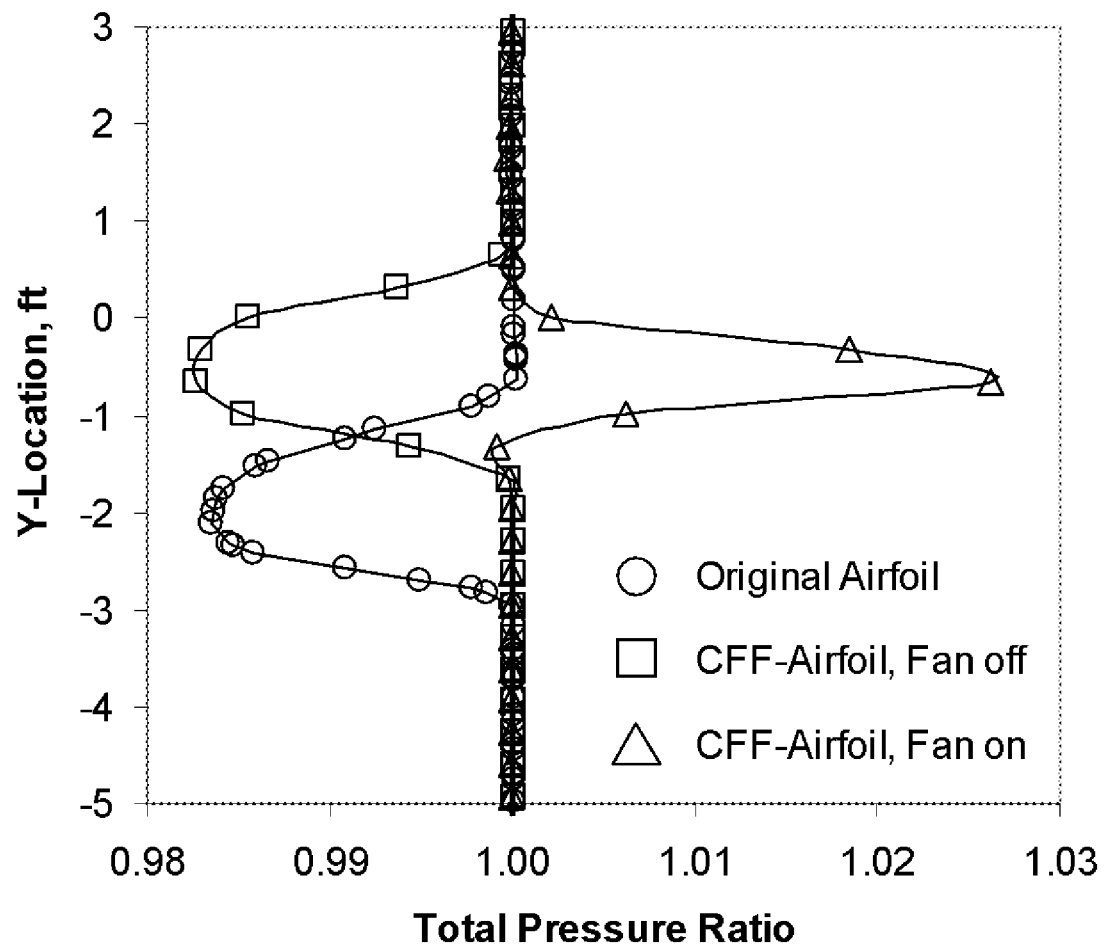
FIG. 8 is a chart of total pressure wake profiles according to the present invention.

FIG. 8 depicts the wake profiles for the 1,000 rpm case, for the fan turned off, and for the original airfoil at 10 degrees angle of attack. The data are shown along a line 20% chord behind the airfoil. With the fan turned off, the wake profile is very similar to that for the original airfoil alone, only shifted in the vertical direction due to the change in the trailing edge geometry. The large total pressure deficit indicates a substantial wake immediately behind the airfoil. With the fan turned on, the total pressure profile outside the jet matches the freestream almost exactly. The jet produces a total pressure increase in the wake region, and entrains the flow near the airfoil trailing edge, virtually eliminating boundary layer separation. Additionally, the jet provides excess thrust, which is necessary in practice, since 3-dimensional effects will be present, while at the same time, complete span-wise distribution of the cross-flow fan system will probably not be possible.

As explained above, the cross-flow fan airfoil is ideal for high-lift STOL applications. To demonstrate this, the airfoil was next placed at 40 degrees angle of attack, with a freestream velocity of 50 ft/s at standard sea level conditions. Additionally, to demonstrate the mechanism for vectored thrust, the exit ducting was deflected 30 degrees downward.

Figure 9:
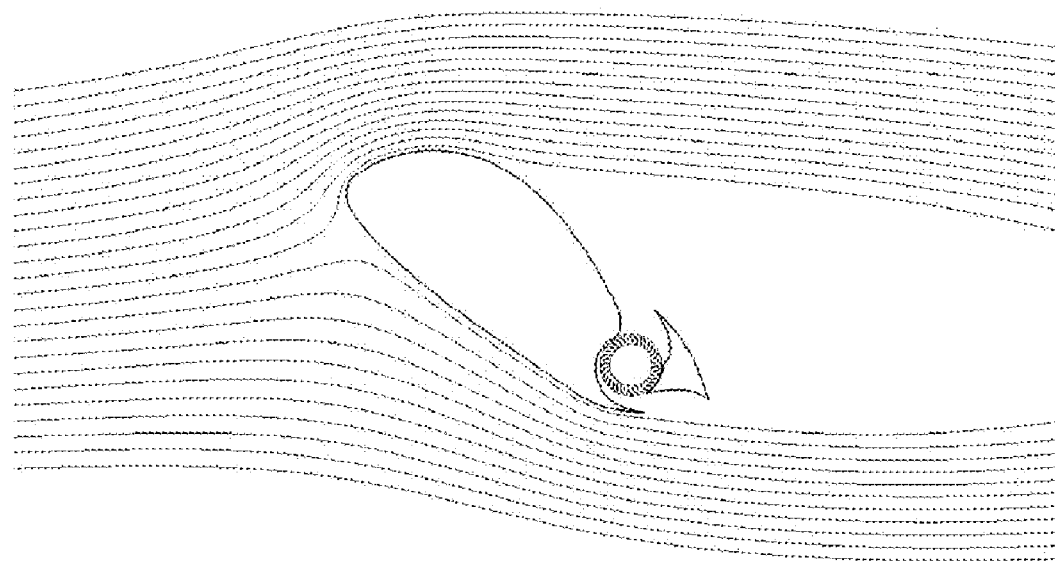
FIG. 9 is a diagram of time-averaged streamlines at 40 degrees angle of attack according to the present invention.
Figure 9:
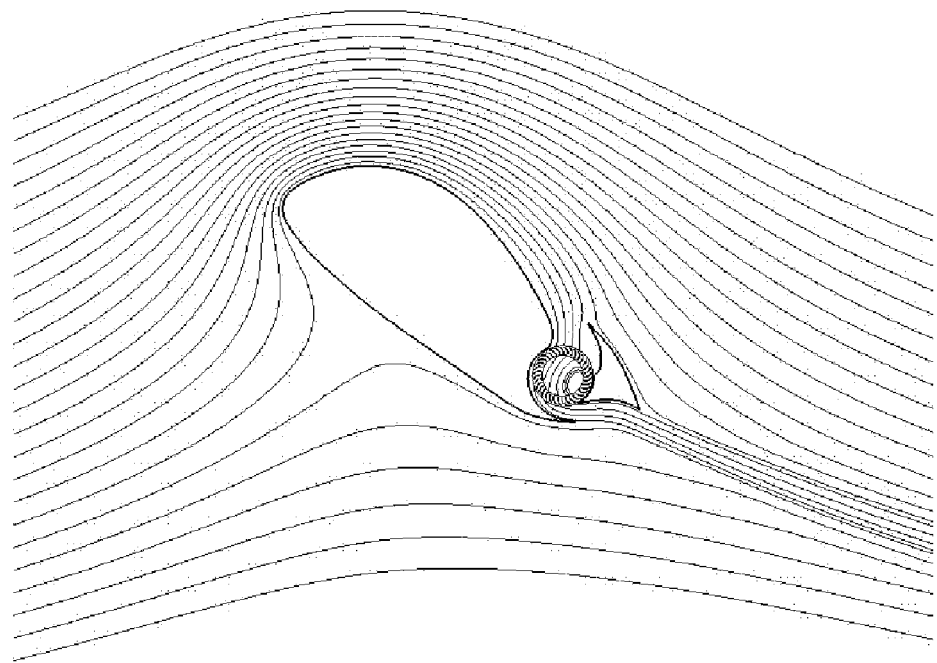

FIG. 9(a) shows the streamlines with the fan off. As expected, a large area of separated flow results. The airfoil here is fully stalled, with a calculated lift coefficient of 1.054. This is in stark contract to the case with the fan turned on. The time-averaged streamlines at 1,250 rpm are plotted in FIG. 9(b), and show that the flow remains fully attached. With the fan on there is a strong suction effect, which draws the flow into the fan housing, prohibiting separation. The computed lift coefficient is 6.408 for this test of the present invention. Assuming the engine has enough power, the rpm can always be increased to provide a stronger suction effect, effectively creating a stall-free airfoil. The effect will only be limited by the mass-flow rate (i.e. fan choking). It is unlikely, however, that choking will be a problem, since the high-lift configuration would only be used at takeoff and landing, where the freestream Mach number is low, and for low-speed maneuvers.

Table 2 provides a summary of the numerical results for the simulations of the present invention at 10 and 40 degrees angle of attack. The negative values for drag coefficient indicate a net thrust. Horsepower was computed using the time-averaged torque on the cross-flow fan blades.

TABLE 2

Summary of numerical results

| Angle of Attack, degrees | $C_L$ | $C_D$ | $\phi$ | $\Psi_t$ | $\eta_t$ | HP per foot of span |
|---|---|---|---|---|---|---|
| 10, Fan off | 0.423 | 0.035 | | | | |
| 10, Fan on - 1,000 rpm | 0.543 | −0.056 | 0.943 | 4.544 | 0.550 | 46.964 |
| 40, Fan off | 1.054 | 0.225 | | | | |
| 40, Fan on - 1,250 rpm | 6.408 | −0.987 | 0.506 | 2.337 | 0.601 | 23.167 |

To adequately implement the present invention, several important features must be included. As already demonstrated by the preceding CFD results, the propulsion system ingests a large amount of boundary layer, or wake, flow from the airfoil suction surface. Inlet momentum deficit does not strongly affect CFF performance; however, it does play a major role at the system level. In the current design, the flow exits the propulsor at the trailing edge as a jet, and fills up the wake behind the airfoil. As mentioned previously, this too has a positive effect, and hence must be included in the model. Finally, and probably most importantly, the cross-flow fan itself must be modeled.

Figure 10:
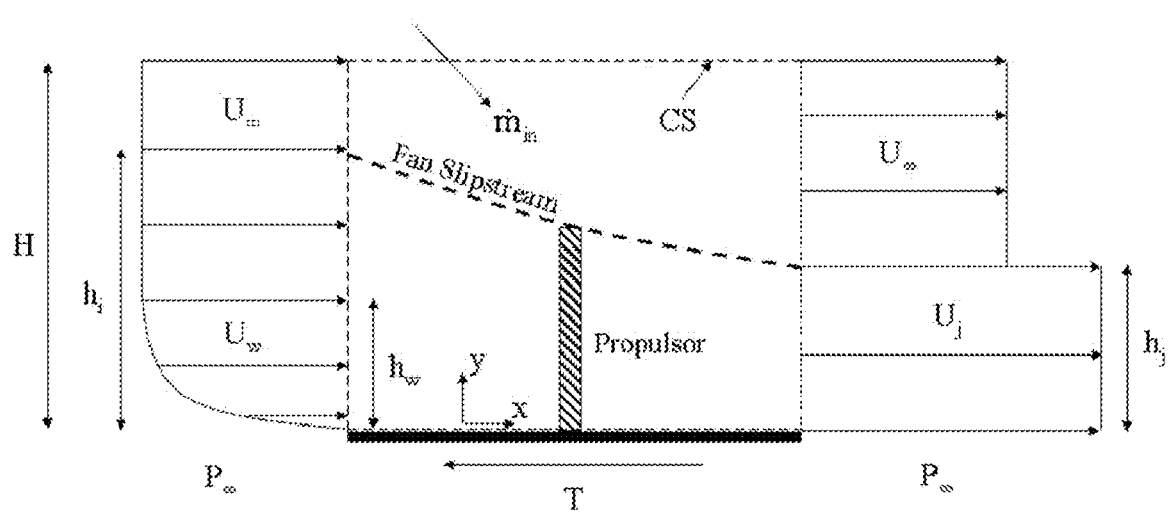
FIG. 10 is a diagram of system analysis with wake ingestion according to the present invention.

The proceeding analysis is based on the model given in FIG. 10. The inlet velocity profile is given by $U_w$, and the inlet height by $h_i$. The flow accelerates through the propulsor, and leaves with velocity $U_j$. Ambient static pressure is assumed at both the inlet and outlet. For low-speed applications, this is usually a good approximation at the outlet, but will not be correct at the inlet, since the pressure is inherently different due to airfoil curvature (i.e. potential field effects). In the design process, one needs to consider this when sizing the inlet. Likewise, when making comparisons with experimental or CFD results, the inlet velocity must be converted to an equivalent profile corresponding to the same total pressure, but at ambient static pressure.

Using conservation of mass and conservation of momentum in the x-direction, given in Eqs. (1) and (2), respectively, propulsor thrust and inlet momentum deficit, termed here boundary layer drag, are determined.

$$\int_{CS} \vec{U} \cdot d\vec{A} = 0 \tag{1}$$

$$F_x = \rho \int_{CS} U_x (\vec{U} \cdot d\vec{A}) \tag{2}$$

For the present model, a constant jet velocity was assumed ($U_j$=Constant). At the inlet, a power-law relation was used, since when compared to the CFD results, this was found to give a good approximation to the mass-flow rate with wake ingestion. The inlet profile is given in Eq. (3), where p is yet to be determined.

$$U_w = \begin{cases} U_\infty (y/h_w)^p & \text{for } 0 \le y \le h_w \\ U_\infty & \text{for } h_w < y \le h_i \end{cases} \tag{3}$$

Inserting Eq. (3) into Eqs. (1) and (2) and performing the integration $$D_{BL} = \rho U_\infty^2 h_w \left[ \frac{1}{p+1} - \frac{1}{2p+1} \right] \tag{4}$$

$$T = \rho U_\infty (U_j - U_\infty) \left[ \frac{h_w}{p+1} + (h_i - h_w) \right] + \rho U_\infty^2 h_w \left[ \frac{1}{p+1} - \frac{1}{2p+1} \right] \tag{5}$$

Dividing Eq. (4) by Eq. (5) gives the ratio of ingested boundary layer drag to thrust. This quantity ranges from zero, corresponding to no wake ingestion (or infinitely large thrust), to one (exhaust velocity equal to freestream velocity), and is a convenient means for comparing different designs. In Eq. (6) $\tilde{h}$ is the ratio of the ingested wake height to the inlet height, and also ranges from zero to one. It is important to note that a small value for $\tilde{h}$ may correspond to either minimal wake ingestion (for a fixed inlet height) or a large inlet height (for a fixed wake ingestion).

$$\frac{D_{BL}}{T} = \frac{1}{\frac{(\tilde{U}_j - 1)\left(\frac{1}{\tilde{h}} + \frac{1}{p+1} - 1\right)}{\frac{1}{p+1} - \frac{1}{2p+1}} + 1} \tag{6}$$

Where $$\tilde{h} = h_w / h_i \tag{7}$$

The cross-flow fan is modeled by bringing in the fan performance map. This is accomplished by using either CFD or experimental data for a particular design, or by using a "nominal" performance map, corresponding to configurations very similar to the present application. This is possible, since it was found that alterations in the baseline inline housing geometry for installation purposes produce only minor changes in the fan performance.

In order to bridge the gap between the exterior analysis and the fan performance curves, it is necessary to match the total pressure rise through the propulsor. Here, the mass-weighted total pressure is used at the inlet $$\overline{P_{T_i}} = \frac{\int_0^{h_i} P_{T_i}(y) d\dot{m}}{\int_0^{h_i} d\dot{m}} \tag{8}$$

Of particular interest are the quantities relating propulsor thrust to the kinetic energy input to the flow and the power input to the fan. The first is called propulsive efficiency, and is defined in Eq. (9).

$$\eta_P = \frac{T U_\infty}{P_P} \tag{9}$$

$$P_P = \frac{1}{2} \rho \int_0^{h_j} U_j^3 dy - \frac{1}{2} \rho \int_0^{h_i} U_w^3 dy \tag{10}$$

Where

Substituting Eqs. (5) and (10) into Eq. (9)

$$\eta_P = \frac{2(\tilde{U}_j - 1)\left[\frac{\tilde{h}}{p+1} + (1 - \tilde{h})\right] + 2\tilde{h}\left[\frac{1}{p+1} - \frac{1}{2p+1}\right]}{(1 - \tilde{h})(\tilde{U}_j^2 - 1) + \tilde{U}_j^2 \frac{\tilde{h}}{p+1} - \frac{\tilde{h}}{3p+1}} \tag{11}$$

Non-dimensionalizing thrust and power, the second relation, given by Eq. (12), represents the amount of thrust produced per unit power. By maximizing this quantity, for a given thrust, the necessary power input will be minimized.

$$\frac{C_T}{C_P} = \frac{4 \eta_t \mu^2}{\Psi_t} \left[ (\tilde{U}_j - 1) + \frac{\frac{\tilde{h}}{p+1} - \frac{\tilde{h}}{2p+1}}{1 - \tilde{h} + \frac{\tilde{h}}{p+1}} \right] \tag{12}$$

Where μ is the advance ratio, and is related to the flow coefficient through the relation $$\phi = \mu \frac{h_i}{D_f}\left[1 - \tilde{h} + \frac{\tilde{h}}{p+1}\right] \quad (13)$$

The system analysis formulation thus involves evaluating the effect of the 3 independent parameters μ, $\tilde{h}$, and $h_i/D_f$ on the overall measures of system performance: $D_{BL}/T$, $C_t/C_p$, and $\eta_p$.

Figure 11:
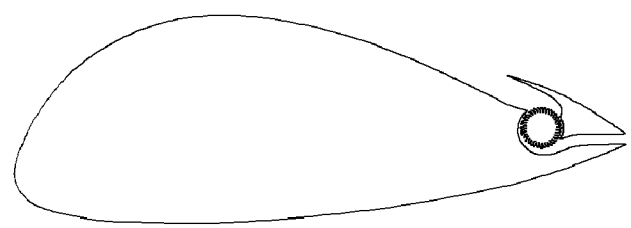
FIG. 11 is a diagram of a modified airfoil according to the present invention.

In order to proceed further, it ist necessary to determine the value of the exponent 'p' in the preceding analysis. In addition, comparison runs were needed. CFD simulations of the baseline inline housing and the present invention were used for these tasks. For the present invention, two different geometries were run. The first corresponded to FIG. 3, where the chord length was 15 ft and the cross-flow fan diameter 2.1 ft. Calculations were performed for seven different rpm settings at zero degree angle of attack with fan speeds ranging from 500 rpm to 1,250 rpm. The second set of runs corresponded to approximately the same exterior airfoil shape, but with a 1.0 ft diameter fan included. This modified geometry is shown in FIG. 11.

Figure 12:
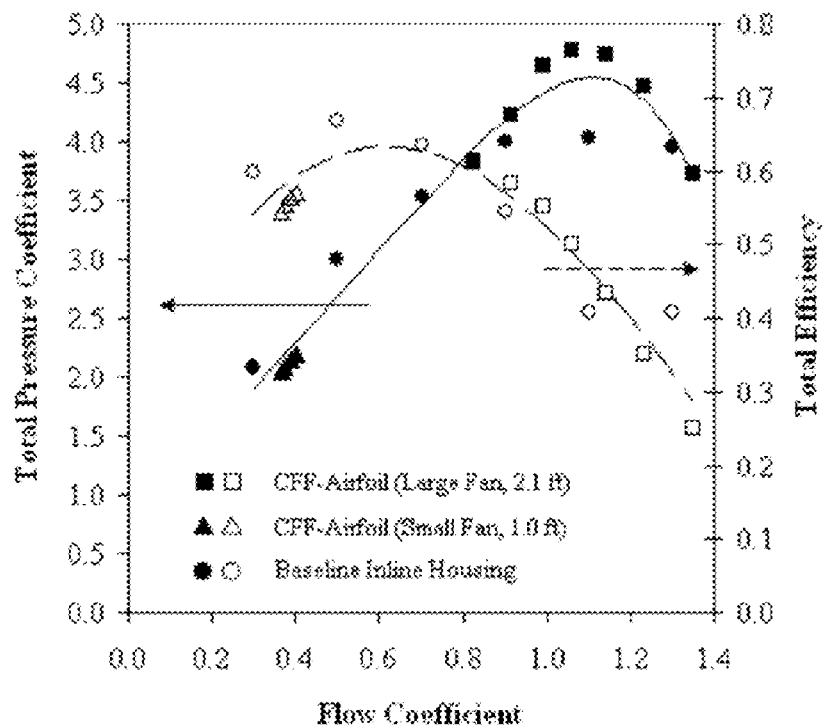
FIG. 12 is a chart of cross-flow fan performance according to the present invention.

A compilation of the fan performance data for all three cases is depicted in FIG. 12. It is important to note that the non-dimensional quantities $\Psi_t$ and $\eta_t$ are not strong functions of inlet/outlet ducting geometry. This is fortunate from the standpoint of system analysis comparisons, since it allows a single curve to represent the fan performance for all cases. The solid and dashed lines plotted in FIG. 12 are polynomial curve-fits for total pressure coefficient and total efficiency, and are given by eqs. (14) and (15), respectively. From the CFF-Airfoil simulations, it was found that p=0.28 gave the best match for mass flow rate across all cases, with an average error of less than 0.3%.

$$\Psi_t = -5.3731\phi^4 + 11.166\phi^3 - 8.3403\phi^2 + 6.5663\phi + 0.4212 \quad (14)$$

$$\eta_t = 0.2898\phi^3 - 1.3829\phi^2 + 1.3682\phi + 0.2479 \quad (15)$$

The present invention includes boundary layer ingestion into the fan, whereas in the conventional propulsion model, the propulsor ingests only uniform freestream flow. From Ref. 2, the thrust, propulsive power, and propulsive efficiency for the latter case are $$T' = \dot{m}'_j(U'_j - U_\infty) \quad (16)$$

$$P'_p = \frac{1}{2}\dot{m}'_j(U'^2_j - U^2_\infty) \quad (17)$$

$$\eta'_p = \frac{2}{\tilde{U}'_j + 1} \quad (18)$$

For comparison, two propulsors with equal thrust and mass flow rate will be used: one with and one without boundary layer ingestion. Dividing Eq. (10) by Eq. (17) yields the propulsive power ratio, which represents the energy savings relative to the conventional non-wake ingestion case.

$$\frac{P_p}{P'_p} = \frac{(1-\tilde{h})(\tilde{U}_j^2 - 1) + \tilde{U}_j^2\frac{\tilde{h}}{p+1} - \frac{\tilde{h}}{3p+1}}{(\tilde{U}'^2_j - 1)\left[\frac{\tilde{h}}{p+1} + (1-\tilde{h})\right]} \quad (19)$$

Where $$\tilde{U}'_j = \tilde{U}_j + \left[\frac{\frac{1}{p+1} - \frac{1}{2p+1}}{\frac{1}{p+1} + \frac{1}{\tilde{h}} - 1}\right] \quad (20)$$

Figure 13:
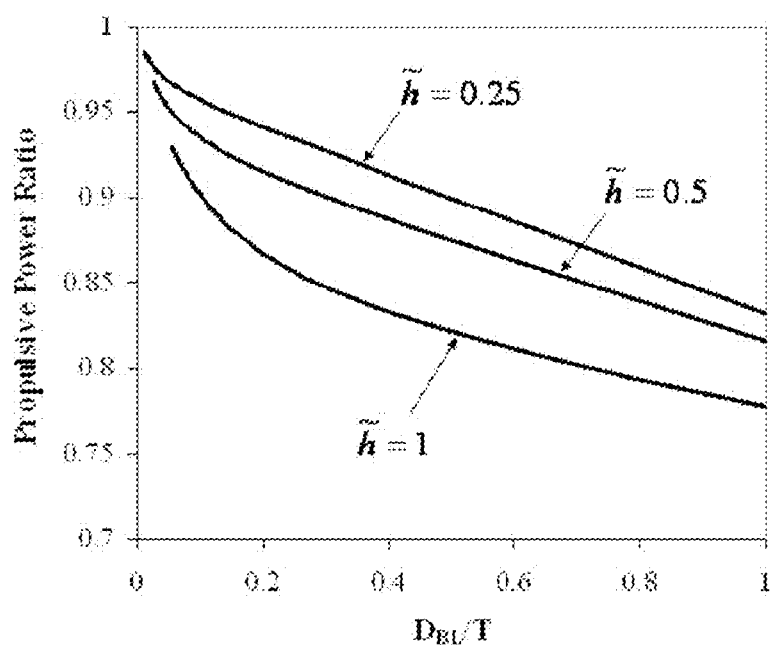
FIG. 13 is a chart of the effect of boundary layer ingestion according to the present invention.
Figure 14:
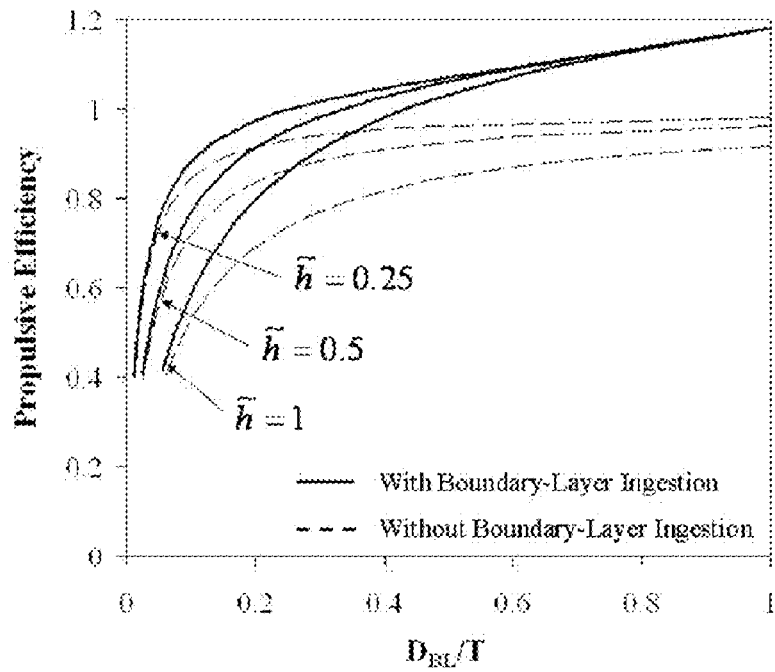
FIG. 14 is a chart of the effect of boundary layer ingestion according to the present invention.

Propulsive power ratio and propulsive efficiency are plotted in FIGS. 13 and 14 versus $D_{BL}/T$ for $h_i/D_f=0.5$. In the figures, small values of $D_{BL}/T$ correspond to large thrust production, whereas $D_{BL}/T=1$ corresponds to a perfect filling-in of the wake behind the airfoil (i.e. the ideal cruising condition). As $D_{BL}/T$ and $\tilde{h}$ increase, propulsive power ratio decreases. The greatest power savings is thus achieved when $D_{BL}/T=1$ and $\tilde{h}=1$ (i.e. boundary layer ingestion is large). Propulsive efficiency also increases with increasing $D_{BL}/T$, and is always greater with boundary layer ingestion. Propulsive efficiency can actually exceed 100% as $D_{BL}/T$ approaches unity[2]. It is interesting to note, however, that as $\tilde{h}$ increases, $\eta_p$ actually decreases. For small values of $D_{BL}/T$, the effect becomes quite significant, and implies that for a specified boundary layer ingestion and propulsor thrust, from a propulsive efficiency standpoint, it is desirable to have a large inlet opening. The implication of these results is that, although small propulsors benefit greatly from boundary layer ingestion, larger ones may still results in better performance. Thus a design tradeoff exists where using a larger fan results in higher propulsive efficiency, but with an added weight penalty and greater drag due to an increase in surface area.

Figure 15:
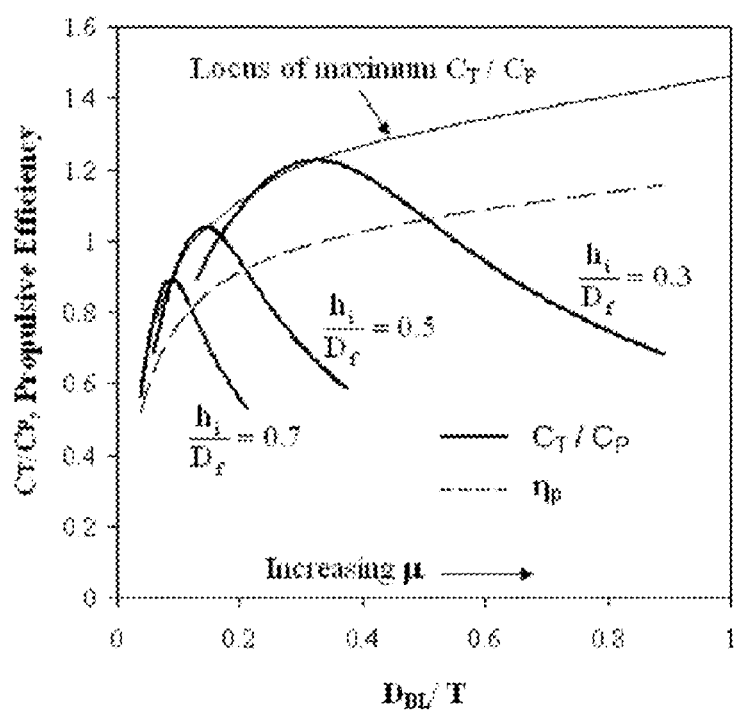
FIG. 15 is a chart of airfoil performance according to the present invention.

The question is now if $\tilde{h}$ is fixed, for example at 0.5, is it beneficial to operate at a high or low value of $h_i/D_f$? This situation is plotted in FIG. 15, which shows that the answer depends on the particular design and operating point. For a fixed value of $\tilde{h}$, a lower $h_i/D_f$ always gives a higher possible value for $C_T/C_P$. The analysis shows that for a fixed inlet height (i.e. fixed $h_i$), the best choice for fan diameter depends on the value of $D_{BL}/T$; for a given $D_{BL}/T$, the fan and housing should be chosen such that operation lies on the maximum $C_T/C_P$ line. For a given wake height, this translates into a direct relation between the necessary thrust and fan diameter for minimum power. Also note, as can be seen in the equations, propulsive efficiency is not a function of $h_i/D_f$.

Figure 16:
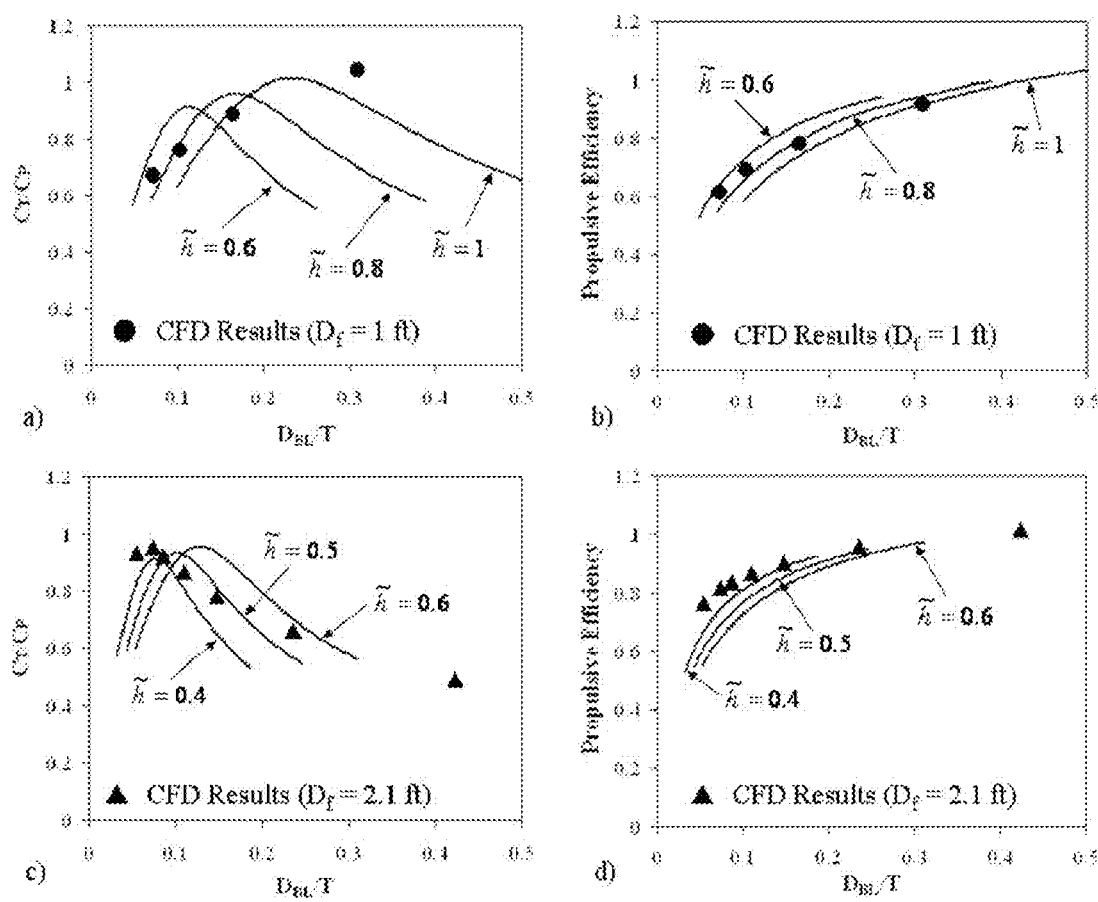
FIG. 16 is a series of charts comparing system analysis according to the present invention.
Figure 17:
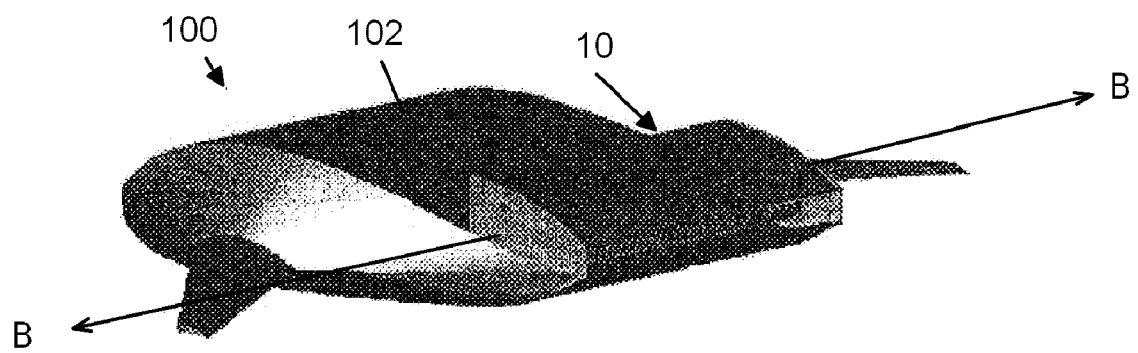
FIG. 17 is a perspective view of an aircraft according to the present invention.
Figure 18:
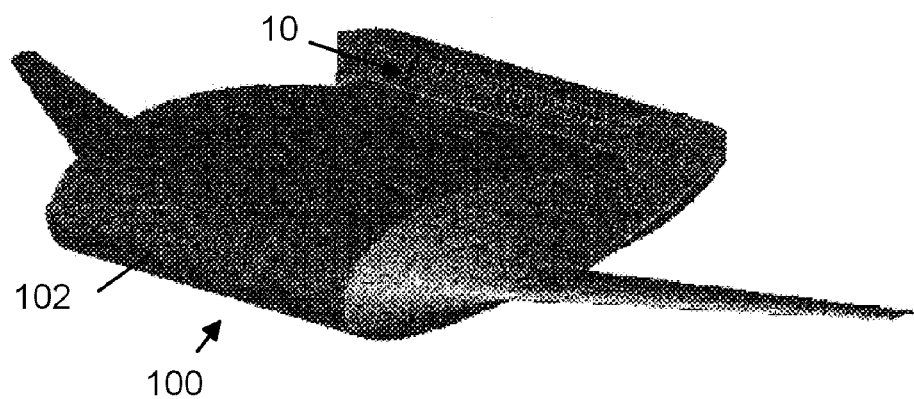
FIG. 18 is another perspective view of an aircraft according to the present invention.
Figure 19:
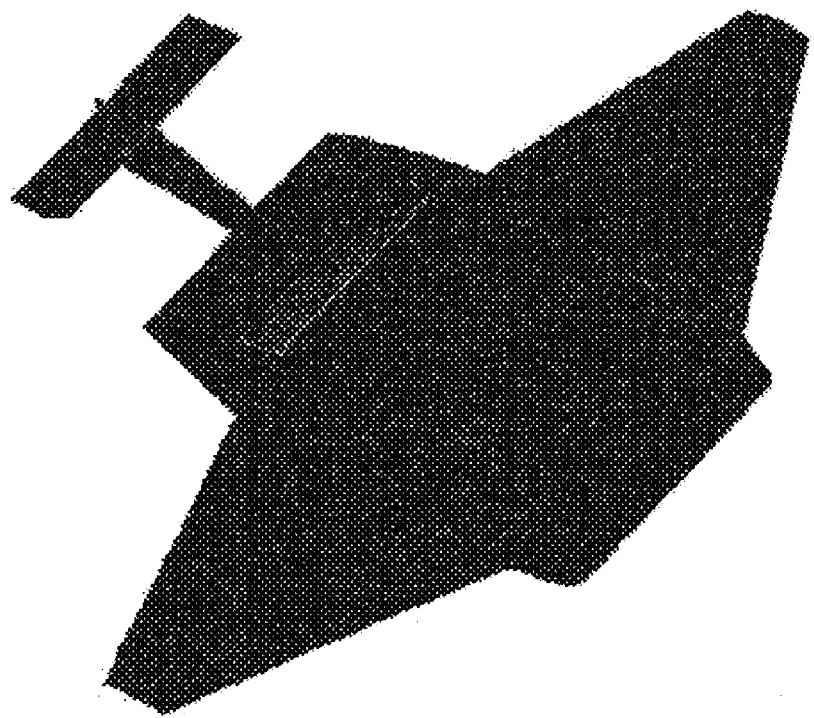
FIG. 19 is a perspective view of a further embodiment of an aircraft according to the present invention.
Figure 20:
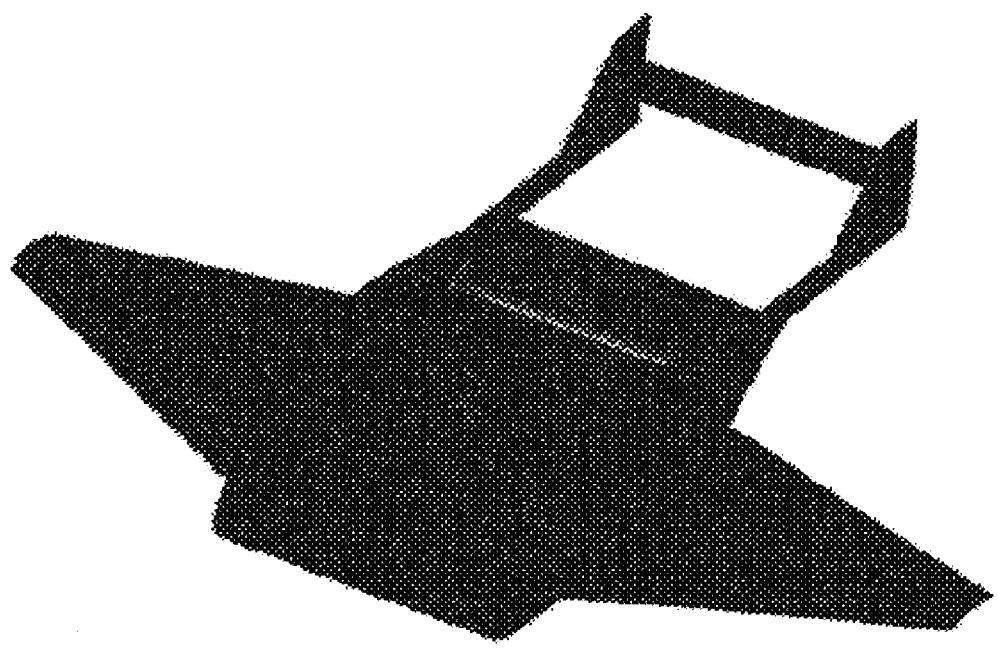
FIG. 20 is a perspective view of an additional embodiment of an aircraft according to the present invention.
Figure 21:
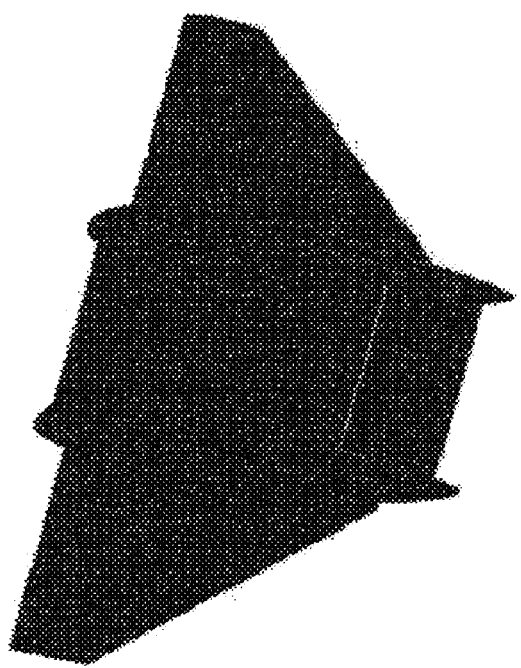
FIG. 21 is a perspective view of another embodiment of an aircraft according to the present invention.

In order to validate the system analysis formulation, comparisons were made with the CFF-Airfoil CFD results. The graphs of $C_T/C_P$ and $\eta_p$ versus $D_{BL}/T$ for both the small and large fan cases are shown in FIG. 16. Excellent agreement is seen between the system analysis predictions and CFD data for propulsive efficiency. For $C_T/C_P$ the system analysis also performs well, especially for the larger fan. It is important to note that the comparison depends heavily on an accurate approximation of the wake height $\tilde{h}$. This should come as no surprise, since it was already seen that large amounts of propulsor wake ingestion create notable differences in overall system performance.

As noted previously, it is necessary to compare the analysis with CFD results where the inlet velocity profile is converted to an equivalent one, but at ambient static pressure. In doing this, one also must assume an isentropic contraction or expansion of the flow, depending on whether the pressure is above or below the ambient value. Thus not only is an equivalent velocity profile determined, but also an equivalent inlet height. What is remarkable is the level of agreement between the analytical and the CFD results, given that the system analysis curves correspond to the actual ratio of inlet height to fan diameter (i.e. the physical value of $h_i/D_f$). If the exact profile for pressure is known at the outset, then even better correlation can be expected. The implication here is that for preliminary design, where the process is reversed, the system analysis will provide a good approximation of the expected performance for a large range of designs, given only a small number of input parameters.

The present invention thus comprises a successful application of wing-embedded, distributed cross-flow fan propulsion. The inline housing design of the present invention smoothly integrates within the airfoil to produce a high total pressure rise and thrust. Additionally, the embedded propulsion system of the present invention reduces the wake size for both low and high angle of attack. Boundary layer reduction and vectored thrust capability provide for very high lift coefficients. By creating an integrated fan/airfoil system according to the present invention, the interference effects caused by external propulsors and their support structures may be eliminated, increasing overall performance. The high propulsive efficiency and low drag in cruise of the present invention provides for increased range over conventional designs. The present invention also readily allows for the mounting of multiple fans along the span of the aircraft. This redundancy improves safety dramatically in the case of fan failure. In addition, the entire housing can be made to lift directly out of the wing for easy maintenance and replacement.

The distribution in the present invention of cross-flow fan airfoil sections along the entire span lends itself directly to flying wing or blended-wing-body (BWB) type aircraft. Additionally, by coupling the cross-flow fans with individual fuel cell powered electric motors, the need for shafts connecting the fans is eliminated. Such an aircraft provides a platform for a future BWB-CFF aircraft: low emission, low noise, redundant power source, highly efficient in cruise, highly maneuverable, and with excellent STOL capabilities. In the center region of the aircraft, the cross-flow fans produce the thrust, with the thick airfoil sections providing ample room for passengers (e.g. a 34% thick airfoil with a 15 ft chord length has a maximum thickness of over 5 feet). Outboard airfoil sections will most likely be thinner, but could still contain cross-flow fans for added thrust, wake reduction, and control via differential thrust (for yaw control) and differential lift through circulation control and vectored thrust (for pitch control).

What is claimed is:

1. An aircraft, comprising:
   a. an aircraft body comprising an airfoil extending along a first axis from a leading edge to a trailing edge, and having a thickness to chord ratio greater than about twenty-five percent; and
   b. a cross-flow propulsion mechanism transversely mounted in said aircraft body and positioned adjacent said trailing edge thereof, said cross-flow propulsion mechanism comprising:
      i. a housing defining an inlet extending above said airfoil, a rotor compartment, and an outlet,
      ii. said inlet positioned on said aircraft body to receive an inflow of air along a second axis,
      iii. a rotor mounted partially within said rotor compartment to extend outwardly from said housing and said airfoil for receiving airflow along said airfoil and rotating about a third axis that is substantially perpendicular to said second longitudinal axis; and
      iv. said outlet adapted to receive the airflow processed through said rotor and exhaust air along a fourth axis.

2. The aircraft according to claim 1, wherein said aircraft body is of a predetermined width.

3. The aircraft according to claim 2, wherein said cross-flow propulsion mechanism is substantially of the same predetermined width as said aircraft body.

4. The aircraft according to claim 1, wherein said inlet is mounted in vertically spaced relation above said airfoil.

5. The aircraft according to claim 1, wherein said cross-flow propulsion mechanism further comprises a vector control mechanism for controlling the direction of airflow through said inlet and out of said outlet.

6. A vehicle convertible between land travel and air travel, comprising:
   a. a vehicle body shaped in the form of an airfoil having leading and trailing edges and a thickness to chord ratio of at least twenty-five percent;
   b. a cross-flow propulsion mechanism transversely mounted relative to said vehicle body adjacent said trailing edge thereof, said cross-flow propulsion mechanism comprising:
      i. a housing defining an inlet, a rotor compartment, and an outlet,
      ii. said inlet positioned outwardly from said compartment to receive an inflow of air along a first axis,
      iii. a rotor mounted partially within said rotor compartment and extending outwardly from said vehicle body for receiving airflow introduced into said housing through said inlet and about a second longitudinal axis that is substantially perpendicular to said first axis; and
      iv. said outlet adapted to receive the airflow processed through said rotor and exhaust air along a third axis that is perpendicular to said second axis.

7. The vehicle according to claim 6, wherein said cross-flow propulsion mechanism further comprises a vector control mechanism for controlling the direction of airflow through said inlet and out of said outlet.

8. The vehicle according to claim 6, further comprising first and second wings adapted for removable attachment to opposing sides of said vehicle body to enhance lift characteristics of said vehicle.

9. The vehicle according to claim 8, further comprising flight control elements adapted for attachment to said vehicle body for improving flight stability.

10. An aircraft, comprising:
   a. an aircraft body comprising an airfoil extending along a first axis from a leading edge to a trailing edge and a thickness to chord ratio of at least twenty-five percent; and
   b. first and second cross-flow propulsion mechanisms transversely mounted in said aircraft body and positioned adjacent said trailing edge thereof, wherein in each of said cross-flow propulsion mechanism comprises:
      i. a housing defining an inlet extending above said airfoil, a rotor compartment, and an outlet,
      ii. said inlet positioned on said aircraft body to receive an inflow of air along a second axis, iii. a rotor mounted partially within said rotor compartment to extend outwardly from said housing and said airfoil for receiving airflow along said airfoil and rotating about a third axis that is substantially perpendicular to said second longitudinal axis; and
iv. said outlet adapted to receive the airflow processed through said rotor and exhaust air along a fourth axis; and
c. a control mechanism for collectively and differentially driving said first and second cross-flow propulsion mechanisms.

11. The aircraft of claim 10, further comprises first and second independently driven deflectors associated with said first and second cross-flow propulsion mechanisms for providing collective and differential vectored thrust.

12. The aircraft of claim 10, wherein said first and second cross-flow propulsion mechanisms further include first and second electric motors associated therewith, respectively, and said aircraft further comprises at least one fuel cell interconnected to said first and second electric motors.

* * * * *